US012709548B2

(12) United States Patent
Casals Mercadal et al.

(10) Patent No.: US 12,709,548 B2
(45) Date of Patent: Aug. 18, 2026

(54) MESOPOROUS SILICA WRAPPED NANOPARTICLE COMPOSITE MATERIAL, PREPARATION METHOD THEREOF, AND USE THEREOF

(71) Applicant: Wuyi University, Jiangmen (CN)

(72) Inventors: Eudald Casals Mercadal, Jiangmen (CN); Muling Zeng, Jiangmen (CN); Hongzhi Zhou, Jiangmen (CN); Qihong Li, Jiangmen (CN); Zhifeng Rong, Jiangmen (CN); Jessica Rosenholm, Jiangmen (CN); Gregori Casals Mercadal, Jiangmen (CN); Victor Puntes, Jiangmen (CN)

(73) Assignee: Wuyi University, Jiangmen (CN)

( * ) Notice: Subject to any disclaimer, the term of this patent is extended or adjusted under 35 U.S.C. 154(b) by 997 days.

(21) Appl. No.: 17/847,142

(22) Filed: Jun. 22, 2022

(65) Prior Publication Data

US 2022/0315440 A1 Oct. 6, 2022

Related U.S. Application Data

(63) Continuation-in-part of application No. PCT/CN2020/071495, filed on Jan. 10, 2020.

(30) Foreign Application Priority Data

Dec. 23, 2019 (CN) ........................ 201911352142.3

(51) Int. Cl.
*C01F 17/206* (2020.01)
*B82Y 35/00* (2011.01)
(Continued)

(52) U.S. Cl.
CPC .......... *C01F 17/206* (2020.01); *C09C 1/3045* (2013.01); *B82Y 35/00* (2013.01);
(Continued)

(58) Field of Classification Search
CPC ....... C01F 17/206; C09C 1/3045; C09C 1/24; C09C 3/063; B82Y 35/00; B82Y 40/00;
(Continued)

(56) References Cited

FOREIGN PATENT DOCUMENTS

| | | | |
|---|---|---|---|
| CN | 104225599 | A | 12/2014 |
| CN | 105154429 | A | 12/2015 |

(Continued)

OTHER PUBLICATIONS

Chen, J.; et al., Synthesis of mesoporous silica hollow nanospheres with multiple gold cores and catalytic activity, Journal of Colloid and Interface Science, 429, 2014, 62-67 (Year: 2014).*

(Continued)

*Primary Examiner* — Christina A Johnson

(57) ABSTRACT

The present disclosure relates to mesoporous silica wrapped nanoparticle composite nanomaterial, preparation method thereof, and use thereof. In the present disclosure, a nanoparticle is dispersed in an aqueous ethanol solution. Then, ammonia water is added to adjust the pH. After that, cetyltrimethylammonium bromide in an aqueous ethanol solution is added dropwise, and ultrasound is continued, before tetraethyl orthosilicate is added dropwise. The mixture is purified to produce a composite nanomaterial that is stable, controllable, and consistent in size; the shell of the composite nanomaterial is mesoporous silica, the core of the composite nanomaterial is a nanoparticle. Dual-core or triple-core nanoparticles of different kinds/functions can be wrapped into a single mesoporous silica shell to achieve multi-core wrapping. The method is universal and may be used to wrap various nanometers. The preparation procedure is environmentally friendly, efficient, and may be carried out at room temperature.

4 Claims, 12 Drawing Sheets

(51) Int. Cl.
*B82Y 40/00* (2011.01)
*C09C 1/30* (2006.01)

(52) U.S. Cl.
CPC .......... *B82Y 40/00* (2013.01); *C01P 2004/04* (2013.01); *C01P 2004/64* (2013.01); *C01P 2004/84* (2013.01); *C01P 2006/12* (2013.01)

(58) Field of Classification Search
CPC .. B82Y 30/00; C01P 2004/04; C01P 2004/64; C01P 2006/12; C01P 2004/32; C01P 2004/84; C01P 2004/03; C01P 2004/80; C01G 1/02; C01G 11/00; C01G 49/08
See application file for complete search history.

(56) References Cited

FOREIGN PATENT DOCUMENTS

| | | |
|---|---|---|
| CN | 105290394 A | 2/2016 |
| CN | 105561315 A | 5/2016 |
| CN | 105903032 A | 8/2016 |
| CN | 107674548 A | 2/2018 |

OTHER PUBLICATIONS

Zhang, M.; et al., Controlled Fabrication of Iron Oxide/Mesoporous Silica Core-Shell Nanostructures, J. Phys. Chem. C, 2013, 117, 21529-21538 (Year: 2013).*

Zhang, D.; et al., Dropwise addition of cation solution: An approach for growing high-quality upconversion nanoparticles, Journal of Colloid and Interface Science, 512, 2018, 141-150 (Year: 2018).*

CN105290394B_English_Translation_Description and Claims (Year: 2017).*

Lelong, G.; et al., Effect of Surfactant Concentration on the Morphology and Texture of MCM-41 Materials, J. Phys. Chem. C, 2008, 112, 10674-10680 (Year: 2008).*

Yongsheng Jia et al., Preparation of functional magnetic core-shell nanoparticles and their adsorption of bisphenol A, Inorganic Chemicals Industry, Apr. 2019, pp. 72-76, vol. 51, No. 4.

International Search Report of PCT Patent Application No. PCT/CN2020/071495 issued on Oct. 10, 2020.

* cited by examiner

| PARAMETERS | | |
|---|---|---|
| $CeO_2NPs$ | 0.6 mg/ml | $2 \times 10^{15}$ NP/ml |
| CTAB | 3 mg/ml | 8.25 mM |
| TEOS | 0.6 μL/ml | 27.07 mM |
| pH | 10 | |
| $EtOH:H_2O$ | 2:8 | |

MESOPOROUS SILICA WRAPPED NANOPARTICLE COMPOSITE MATERIAL, PREPARATION METHOD THEREOF, AND USE THEREOF

CROSS REFERENCE TO RELATED APPLICATIONS

The present application is a continuation-in-part application of PCT application No. PCT/CN2020/071495 filed on Jan. 10, 2020, which claims the benefit of Chinese Patent Application No. 201911352142.3 filed on Dec. 23, 2019, each of which is incorporated by reference herein in its entirety.

FIELD OF THE INVENTION

The present disclosure relates to mesoporous silica wrapped nanoparticle composite nanomaterial, preparation method thereof, and use thereof. The material can be used in medicine, catalysts, energy generation, or environmental pollution control.

BACKGROUND OF THE INVENTION

Nanomaterials have a wide range of applications as a result of their unique physicochemical properties. However, their practical applications are limited due to difficulties in controlling their stability. Mesoporous silica materials have uniform morphology, adjustable pore channels, high pore volume, high specific surface area, good biocompatibility, and good degradability, and they can be readily subjected to surface modification. Mesoporous silica materials are carriers with great application potential. Many researchers are currently attempting to overcome the challenge of nanomaterial stability by wrapping various nanoparticles (core) in mesoporous silica material (shell).

However, at present, the following problems exist in mesoporous silica wrapped nanoparticles:

(1) Only one type of nanoparticle can be wrapped.

(2) Most experiments need to be carried out at high temperatures, and the procedures are lengthy.

(3) Most of the experiments involve non-polar (hydrophobic) solvents, such as chloroform, dichlorobenzene, etc., which limits the applications of the material in, for example, medicine, environmental protection, among others.

(4) The stability of the coated nanoparticles is still not high.

(5) The particle sizes of the mesoporous silica nanoparticles prepared are uncontrollable and fluctuate over a large range.

(6) In some experiments, the surface of the nanoparticle is first coated, and then the core-shell material is prepared by wrapping with mesoporous silica. Although the stability of the nanoparticles is improved, the multi-layer wrapping results in reduced specific surface effect/activity.

SUMMARY OF THE INVENTION

To overcome the above drawbacks of the prior art, the objective of the present disclosure is to provide a mesoporous silica wrapped nanoparticle composite nanomaterial, a preparation method thereof, and use thereof.

To achieve the objectives above, the technical solutions of the present disclosure are as follows:

In the first aspect, the present disclosure provides a method for preparing a mesoporous silica wrapped nanoparticle composite nanomaterial, comprising the following procedures:

(1) dispersing a nanoparticle in an aqueous ethanol solution, then adding ammonia water and stirring thoroughly to obtain solution A; dissolving cetyltrimethylammonium bromide in an identical aqueous ethanol solution to obtain solution B;

(2) adding solution B dropwise to solution A under ultrasound, and then continue performing ultrasound to obtain solution C;

(3) adding tetraethyl orthosilicate dropwise to solution C, followed by consecutive stirring, solid-liquid separation and purification to obtain the composite nanomaterial;

wherein the nanoparticle has a particle size of 1-20 nm. In the preparation method, the nanoparticles are the core, and radially arranged mesoporous silica shells are prepared thereon. It is possible to obtain a stable composite nanomaterial without forming an interface bonding layer on the surface of the nanoparticles. The wrapping of one type of nanoparticles can be achieved; furthermore, dual-core or triple-core nanoparticles with different functions can be wrapped into a single mesoporous silica shell to achieve multi-core wrapping. The method is universal and may be used to wrap various nanometers to create composite nanomaterials that can be employed in a variety of applications. 100 nm is the dividing line between micron-sized materials and nanomaterials. Only materials with a particle size of less than 100 nm can be applied to the medical field. The inventor discovered that when the particle size of the nanoparticle is larger than 20 nm, the silica shell must be very thin if we want to control the particle size of the final composite nanomaterial to be within 100 nm. In one aspect, this results in poor stability of the composite nanomaterial; in another aspect, some nanoparticles are prevented from being loaded into the mesopores of the silica. The smaller the nanoparticle (particularly Au nanoparticle, $Fe_3O_4$ nanoparticle, and $CeO_2$ nanoparticle), the greater the specific surface area and the activity of the material obtained by wrapping the nanoparticle with mesoporous silica. However, controlling the dispersibility and stability of nanoparticles becomes increasingly challenging as they get smaller. When the particle size of the nanoparticle is 1-20 nm, the particle size of the composite nanomaterial obtained can be controlled below 100 nm, even as low as 50 nm, and the nanoparticle can be nicely and uniformly loaded into the mesoporous silica. The composite nanomaterial obtained is stable and highly active. In addition, the preparation procedure is environmentally friendly, efficient, and may be carried out at room temperature without heat or cooling. The solvent used is hydrophilic, the cost is low, and the process is straightforward. Composite nanomaterials of different sizes can be obtained by adjusting the ratio of the reagents used. The preparation process has a number of advantages that are beneficial for using the composite nanomaterial generated in fields like biomedicine. These advantages include, for example, small size of the final composite material, straightforward preparation process and low cost (performed in an aqueous solution and at room temperature), and a stable, multifunctional, and controllable nanocomposite product.

As a preferred embodiment of the method of the present disclosure, the aqueous ethanol solution A is identical to the aqueous ethanol solution B, in which a volume ratio of ethanol to water is 1:3-4. When aqueous ethanol solution A and aqueous ethanol solution B are identical, and the volume ratio of ethanol to water is less than ¼, although the nanoparticle can be wrapped into the mesoporous silica, the silica cannot form a uniform and stable spherical shape. When the volume ratio of ethanol to water is greater than ⅓, the final size of the composite nanomaterial product increases suddenly and uncontrollably. When the volume ratio of ethanol to water is within the range of ¼ and ⅓, the mesoporous silica shell of the composite nanomaterial obtained has a uniform and stable spherical shape, and controllable size. In addition, the size of the nanomaterial composite can be changed by adjusting the volume ratio of ethanol and water. In this way, the particle size of the composite nanomaterial can be controlled within the range of 50-80 nm.

As a preferred embodiment of the method of the present disclosure, solution A has a pH of 9-10. When the pH of solution A is larger than 10, although the nanoparticle can be wrapped into the mesoporous silica, the silica cannot form a uniform and stable spherical shape. When the pH of solution A is smaller than 9, the nanoparticle becomes unstable, its surface potential (negative) will weaken, resulting in a weakened attraction to CTAB (positive surface potential). Consequentially, the final encapsulated core-shell structure cannot be formed; that is, the nanoparticle cannot be wrapped into mesoporous silica.

As a preferred embodiment of the method of the present disclosure, a ratio of mass of the cetyltrimethylammonium bromide to a specific surface area of the nanoparticle is 1 mg-3 mg: $10^{14}$ $nm^2$-$10^{17}$ $nm^2$. The inventor discovered for the first time that controlling the specific surface area of the nanoparticle is not only critical for the successful preparation of the composite nanomaterial, but also a key factor in extending the preparation method of the present disclosure to other nanoparticles. When the ratio of the mass of CTAB to the specific surface area of the nanoparticle is greater than 3 mg/$10^{14}$ $nm^2$, part of the nanoparticle is wrapped by silica, and part is not. The size of the final material is uncontrollable, the wrapping is either uneven or unsuccessful. When the ratio of the mass of CTAB to the specific surface area of the nanoparticle is less than 1 mg/$10^{17}$ $nm^2$, the final core-shell structure is not uniform, the size is uncontrollable, or the wrapping is unsuccessful. When the ratio of the mass of CTAB to the specific surface area of the nanoparticle is within the range of 1 mg-3 mg: $10^{14}$ $nm^2$-$10^{17}$ $nm^2$, it is possible to produce spherical, stable, uniformly coated, and size-controllable core-shell composite nanomaterials.

As a preferred embodiment of the method of the present disclosure, a ratio of mass of CTAB to a specific surface area of the nanoparticle is 3 mg/$10^{17}$ $nm^2$.

As a preferred embodiment of the method of the present disclosure, a volume ratio of solution B to solution A is 1:9.

As a preferred embodiment of the method of the present disclosure, in step (2), the CTAB has a concentration of 30 mg/mL in solution B.

As a preferred embodiment of the method of the present disclosure, in step (2), the ultrasound is continued for at least 30 minutes.

As a preferred embodiment of the method of the present disclosure, in step (3), a ratio of the tetraethyl orthosilicate to the CTAB is 1 mL:5 g.

As a preferred embodiment of the method of the present disclosure, in step (3), the stirring is performed for 12 h.

In a second aspect, the disclosure provides a composite nanomaterial prepared by the method described above.

As a preferred embodiment of the method of the present disclosure, the composite nanomaterial has a particle size of 50-80 nm.

In a third aspect, the present disclosure provides use of the composite nanomaterial in medicine, catalysts, energy generation, or environmental pollution control.

Compared with the prior art, the beneficial effects of the present disclosure are:

(1) The solvent used in the preparation method of the present disclosure is hydrophilic. No heating or cooling is required. The process is straightforward, environmentally friendly, and efficient. Two or more nanoparticles can be wrapped into the same mesoporous silica shell. The method is universal, which means it can be applied to the wrapping of different nanoparticles to synthesize various composite nanomaterials sought after by different fields.

(2) The composite nanomaterials prepared by the method of the present disclosure are stable, consistent in size, and have particle sizes as low as 50 nm. Composite nanomaterials of different sizes can be obtained by adjusting the ratio of the reagents used.

(3) The composite nanomaterial prepared by the method of the present disclosure is suited for use in fields including medicine, catalysts, energy generation, or environmental pollution control.

BRIEF DESCRIPTION OF DRAWINGS

FIG. 2A is the TEM image of $Gd_2O_3$NPs; FIGS. 2B and 2C are the TEM images of $SiO_2$@$Gd_2O_3$NPs; FIG. 2D is the TEM image of $Fe_3O_4$NPs; FIGS. 2E and 2F are the TEM images of $SiO_2$@$Fe_3O_4$NPs; FIG. 2G is the TEM image of UCNPs; FIGS. 2H and 2I are the TEM images of $SiO_2$@UCNPs; FIG. 2J is the TEM image of $CeO_2$NPs; FIGS. 2K and 2L are the TEM images of $SiO_2$@$CeO_2$NPs.

FIG. 3A shows representative TEM images (left: scale bar 100 nm, right: scale bar 20 nm) of double-core nanocomposites combining superparamagnetic metal oxide NPs ($Fe_3O_4$) and metallic NPs (AgNPs) in the same mesoporous silica shell. FIG. 3B shows representative TEM and High Angle Annular Dark Field (HAADF) and the elemental mapping of the different elements (O, Si, Fe and Ag).

FIG. 4A is a representative TEM image of double core nanocomposites combining metallic NPs (AuNPs) and anti-inflammatory metal oxide NPs ($CeO_2$NPs). FIG. 4B is a higher magnification TEM image of one of the nanocomposites. FIG. 4C is a representative HAADF image. In this case, the AuNPs can also be easily distinguished as brighter NPs in the HAADF image owing to the higher density of Au. FIG. 4D is the overlap of the elemental mapping of the different elements (Si, Ce and Au). The scale bars for FIGS. 4A-D are all 100 nm.

DETAILED DESCRIPTION OF EMBODIMENTS

The present disclosure will be further explained below with reference to the embodiments in order to more clearly demonstrate the technical solutions, embodiments, and beneficial effects of the present disclosure.

Embodiment 1

Figure 1:
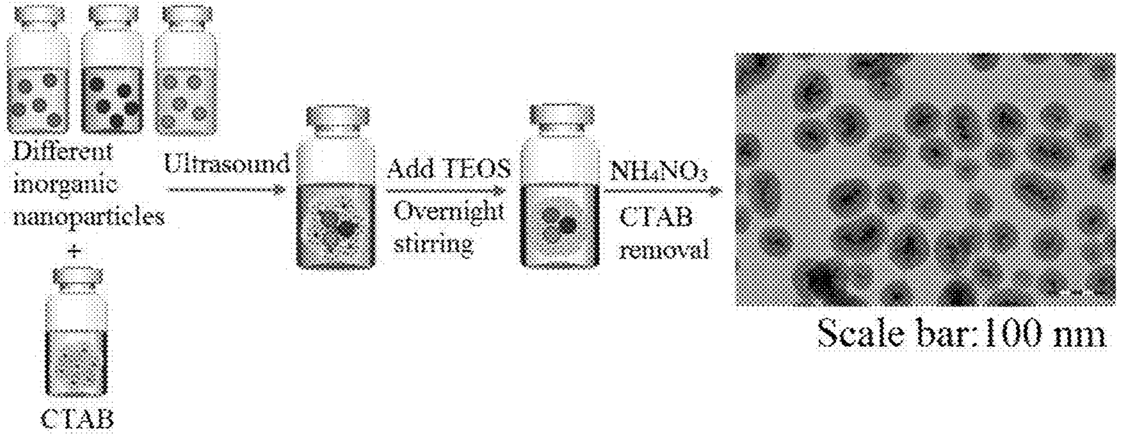
FIG. 1 is a process flow diagram of the preparation method of the present disclosure.
Figure 2A:
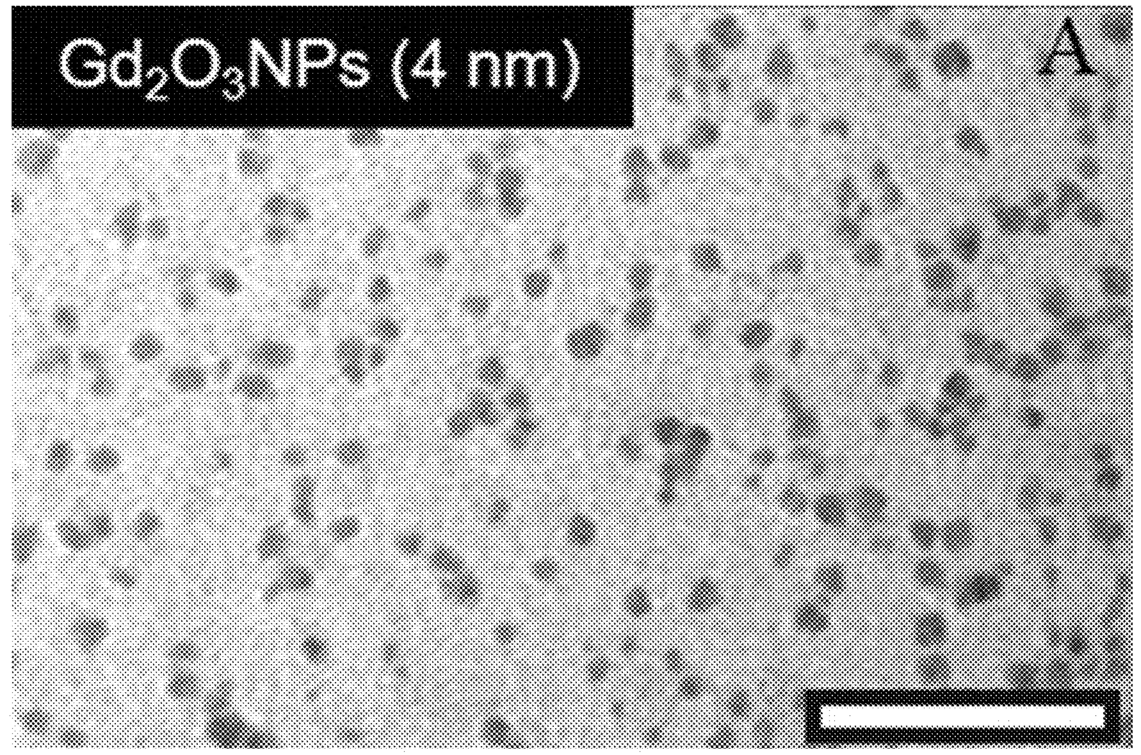
FIGS. 2A-2L are TEM (Transmission Electron Microscope) images of four of the mesoporous silica wrapped nanoparticle composite nanomaterials prepared according to the preparation method of the present disclosure and their corresponding nanoparticles. Scale bars for these images are all 100 nm.
Figure 2B:
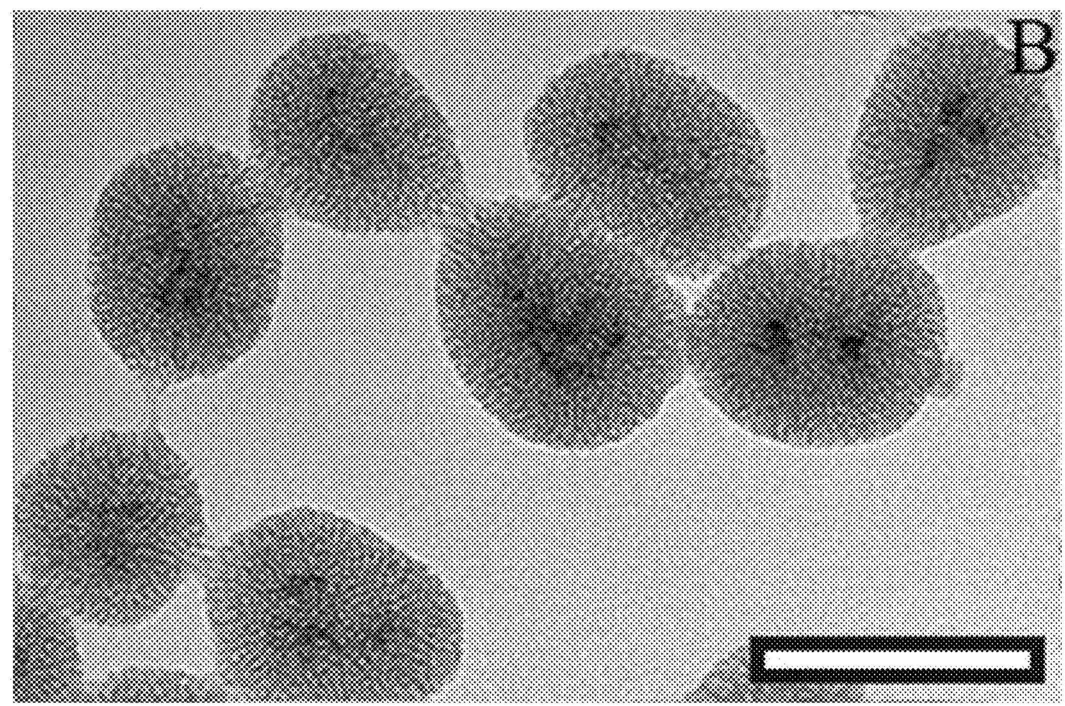
Figure 2C:
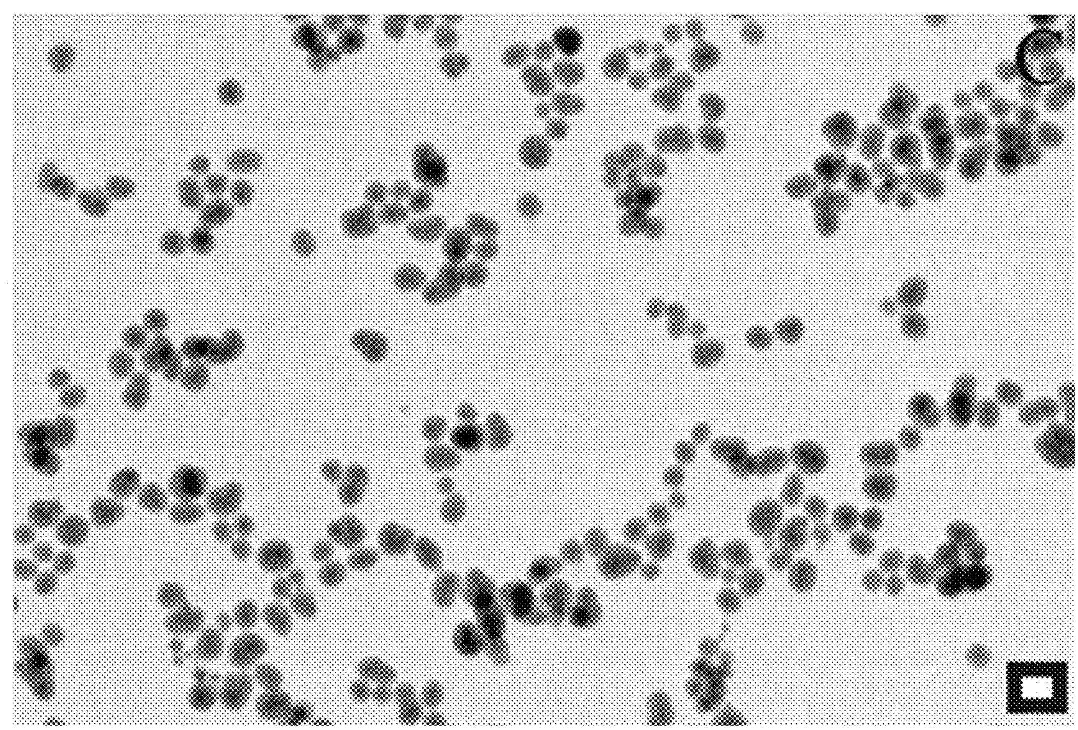

This embodiment is an example of a method for preparing a mesoporous silica wrapped nanoparticle composite nanomaterial, comprising the following steps:

(1) dispersing $Gd_2O_3$NPs (particle size 4 nm, TEM diagram shown in FIG. 2A) in an aqueous ethanol solution (volume ratio of ethanol to water=1:4), then adding ammonia water and stirring for 30 min to obtain solution A having a pH of 10 (the specific surface area of the nanoparticles are calculated according to their particle sizes; for the ratio of mass of CTAB (cetyltrimethylammonium bromide) to the specific surface area of the nanoparticles to be 3 mg: $10^{17}$ $nm^2$, the concentration of $Gd_2O_3$NPs in solution A should be 0.5 mg/mL); adding CTAB to an identical aqueous ethanol solution and stirring for 30 min to obtain solution B, wherein the concentration of CTAB in solution B is 30 mg/mL;

(2) adding solution B dropwise to solution A under ultrasound (volume ratio of solution B to solution A=1:9), and then continue performing the ultrasound for at least 30 minutes to obtain solution C;

(3) adding TEOS (tetraethyl orthosilicate) dropwise to solution C at a ratio of TEOS:CTAB=1 mL:5 g, followed by 12 hours of stirring, then centrifuging, and washing the solid collected 3 times (each time, the solid is added to the washing liquid, mixed for half an hour, and then centrifuged to obtain the composite nanomaterial; the washing liquid is prepared from ammonium nitrate and ethanol at a ratio of ammonium nitrate: ethanol=2 g:100 mL). The composite nanomaterial is $SiO_2$@$Gd_2O_3$NPs, its TEM diagrams are shown in FIGS. 2B and 2C.

Embodiment 2

Figure 2D:
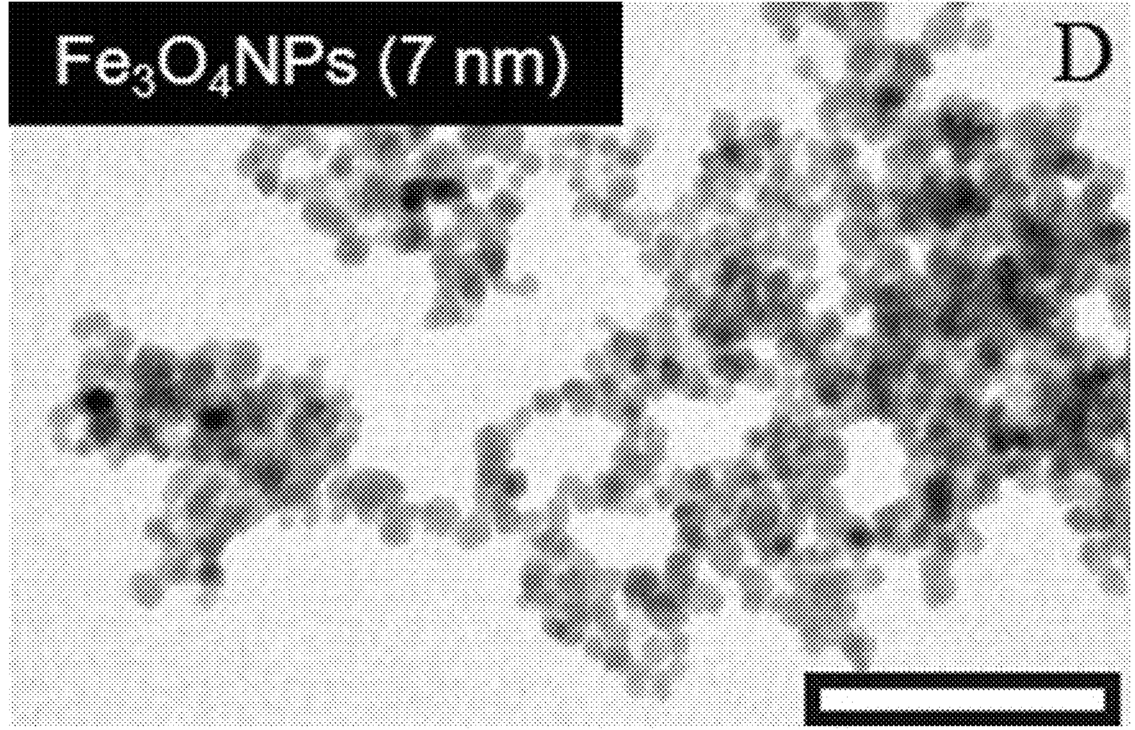
Figure 2E:
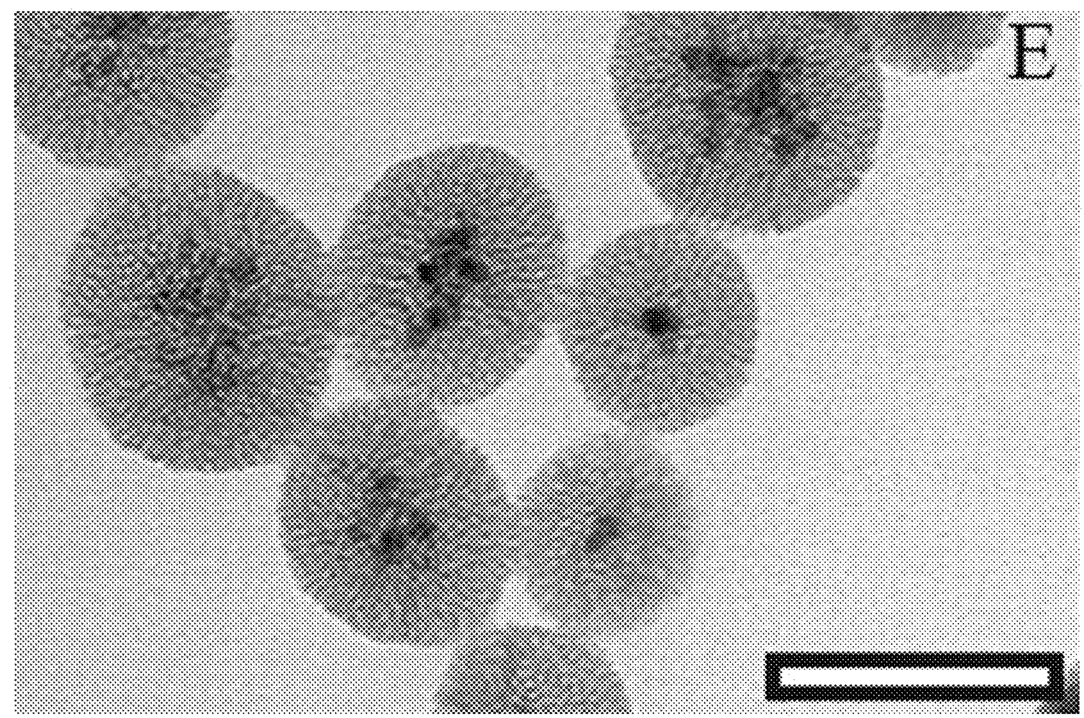
Figure 2F:
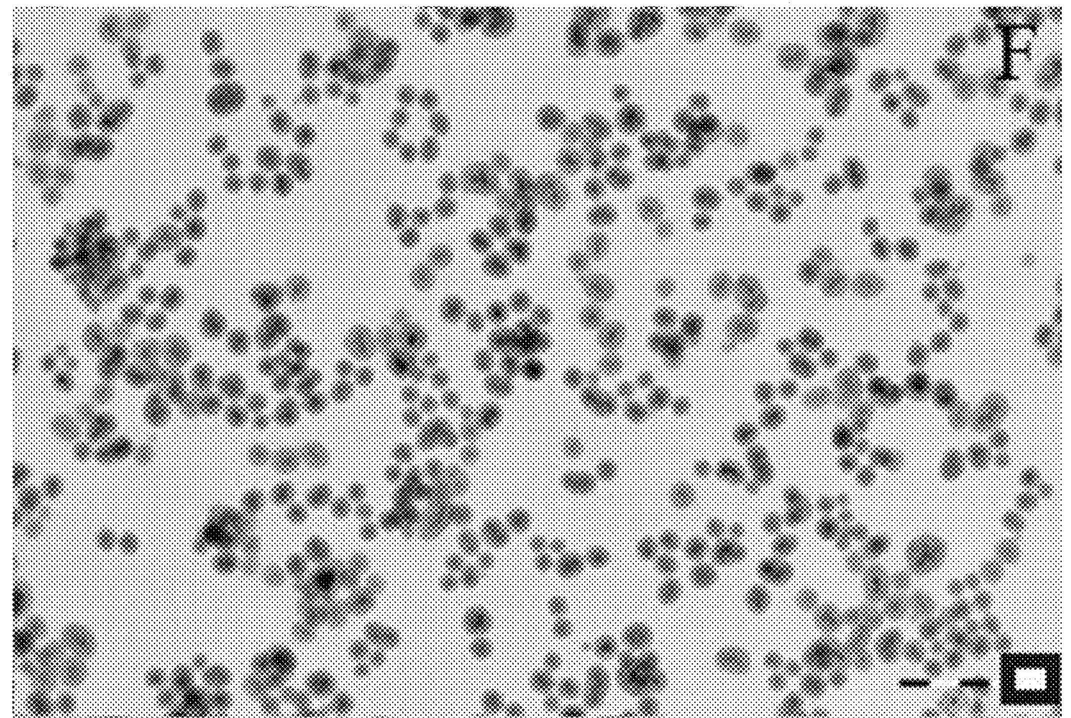

This embodiment is an example of a method for preparing a mesoporous silica wrapped nanoparticle composite nanomaterial, comprising the following steps:

(1) dispersing $Fe_3O_4$NPs (particle size 7 nm, TEM diagram shown in FIG. 2D) in an aqueous ethanol solution (volume ratio of ethanol to water=1:4), then adding ammonia water and stirring for 30 min to obtain solution A having a pH of 10 (the specific surface area of the nanoparticles are calculated according to their particle sizes; for the ratio of mass of CTAB to the specific surface area of the nanoparticles to be 3 mg: $10^{17}$ $nm^2$, the concentration of $Fe_3O_4$NPs in solution A should be 0.6 mg/mL); adding CTAB to an identical aqueous ethanol solution and stirring for 30 min to obtain solution B, wherein the concentration of CTAB in solution B is 30 mg/mL;

(2) adding solution B dropwise to solution A under ultrasound (volume ratio of solution B to solution A=1:9), and then continue performing the ultrasound for at least 30 minutes to obtain solution C;

(3) adding TEOS dropwise to solution C at a ratio of TEOS:CTAB=1 mL:5 g, followed by 12 hours of stirring, then centrifuging, and washing the solid collected 3 times (each time, the solid is added to the washing liquid, mixed for half an hour, and then centrifuged to obtain the composite nanomaterial; the washing liquid is prepared from ammonium nitrate and ethanol at a ratio of ammonium nitrate:ethanol=2 g:100 mL). The composite nanomaterial is $SiO_2$@$Fe_3O_4$NPs, its TEM diagrams are shown in FIGS. 2E and 2F.

Embodiment 3

Figure 2G:
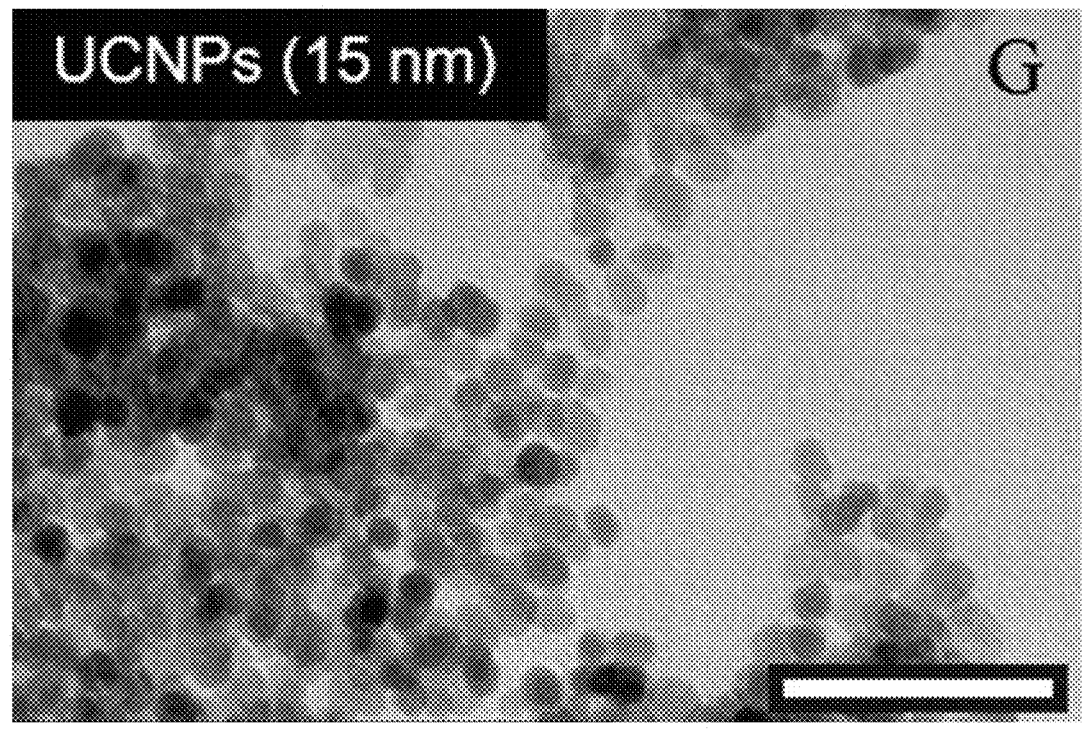
Figure 2H:
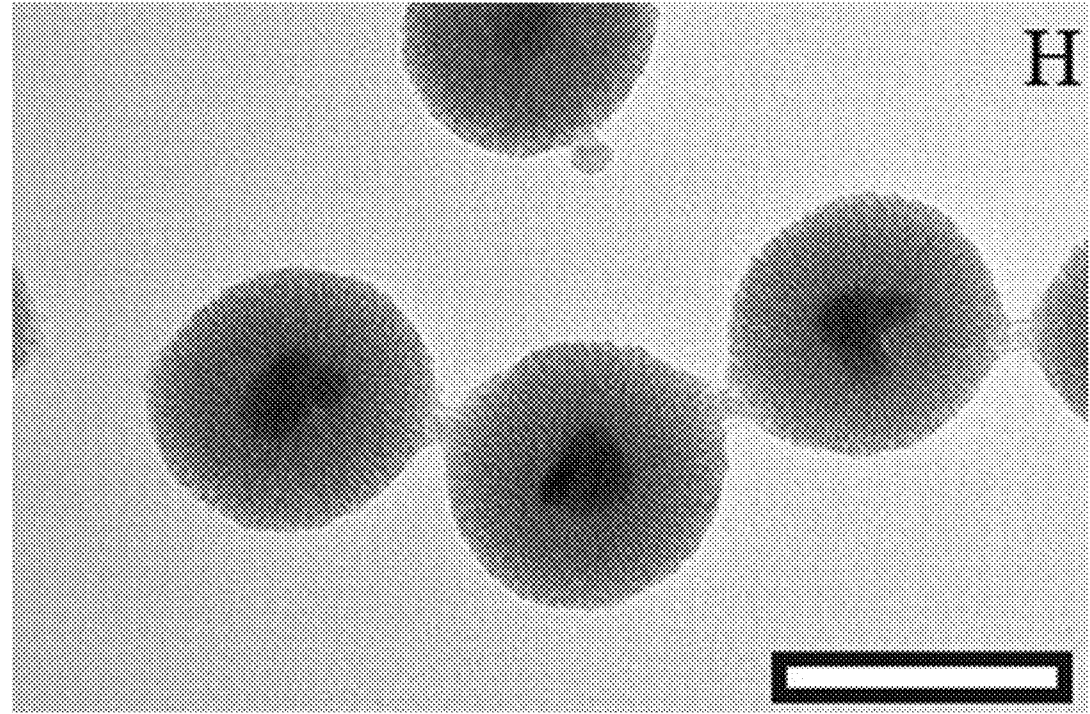
Figure 2I:
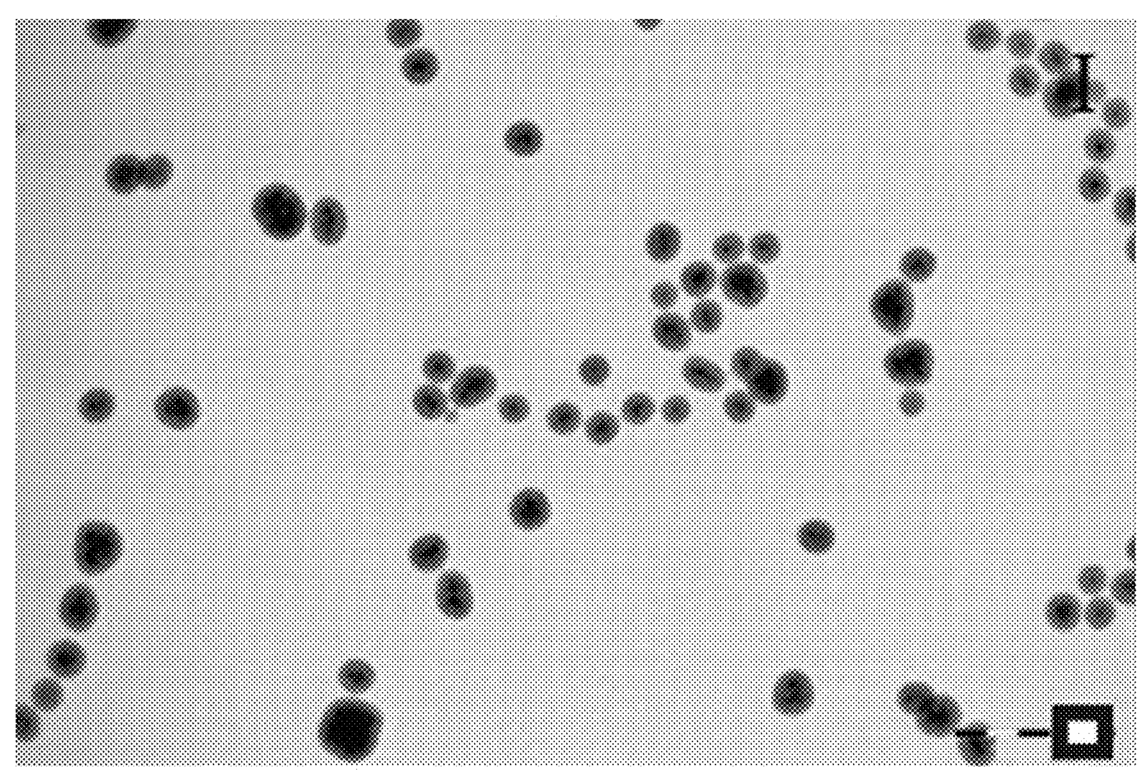

This embodiment is an example of a method for preparing a mesoporous silica wrapped nanoparticle composite nanomaterial of the present disclosure, comprising the following steps:

(1) dispersing UCNPs (that is, $Tm^{3+}$ co-doped $NaYF_4$ nanocrystals, $Tm^{3+}$ upconversion nanophosphors; particle size 15 nm, TEM diagram shown in FIG. 2G) in an aqueous ethanol solution (volume ratio of ethanol to water=1:4), then adding ammonia water and stirring for 30 min to obtain solution A having a pH of 10 (the specific surface area of the nanoparticles are calculated according to their particle sizes; for the ratio of mass of CTAB to the specific surface area of the nanoparticles to be 3 mg: $10^{17}$ $nm^2$, the concentration of UCNPs in solution A should be 1.5 mg/mL); adding CTAB to an identical aqueous ethanol solution and stirring for 30 min to obtain solution B, wherein the concentration of CTAB in solution B is 30 mg/mL;

(2) adding solution B dropwise to solution A under ultrasound (volume ratio of solution B to solution A=1:9), and then continue performing the ultrasound for at least 30 minutes to obtain solution C;

(3) adding TEOS dropwise to solution C at a ratio of TEOS:CTAB=1 mL:5 g, followed by 12 hours of stirring, then centrifuging, and washing the solid collected 3 times (each time, the solid is added to the washing liquid, mixed for half an hour, and then centrifuged to obtain the composite nanomaterial; the washing liquid is prepared from ammonium nitrate and ethanol at a ratio of ammonium nitrate:ethanol=2 g:100 mL). The composite nanomaterial is $SiO_2$@UCNPs, its TEM diagrams are shown in FIGS. 2H and 2I.

Embodiment 4

Figure 2J:
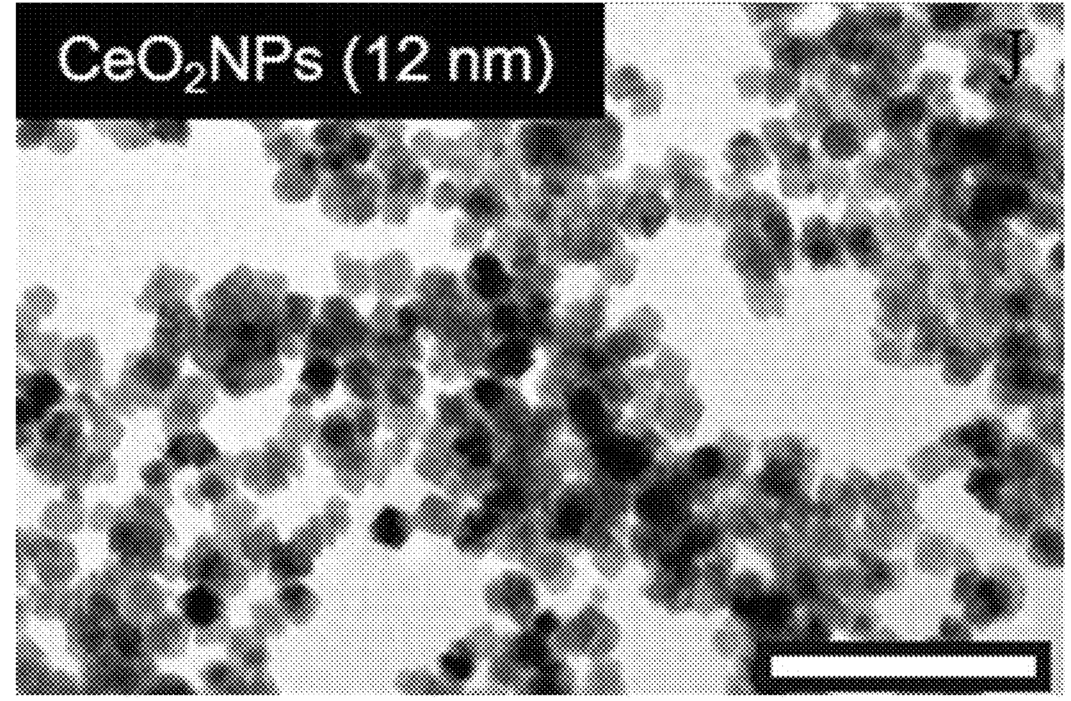
Figure 2K:
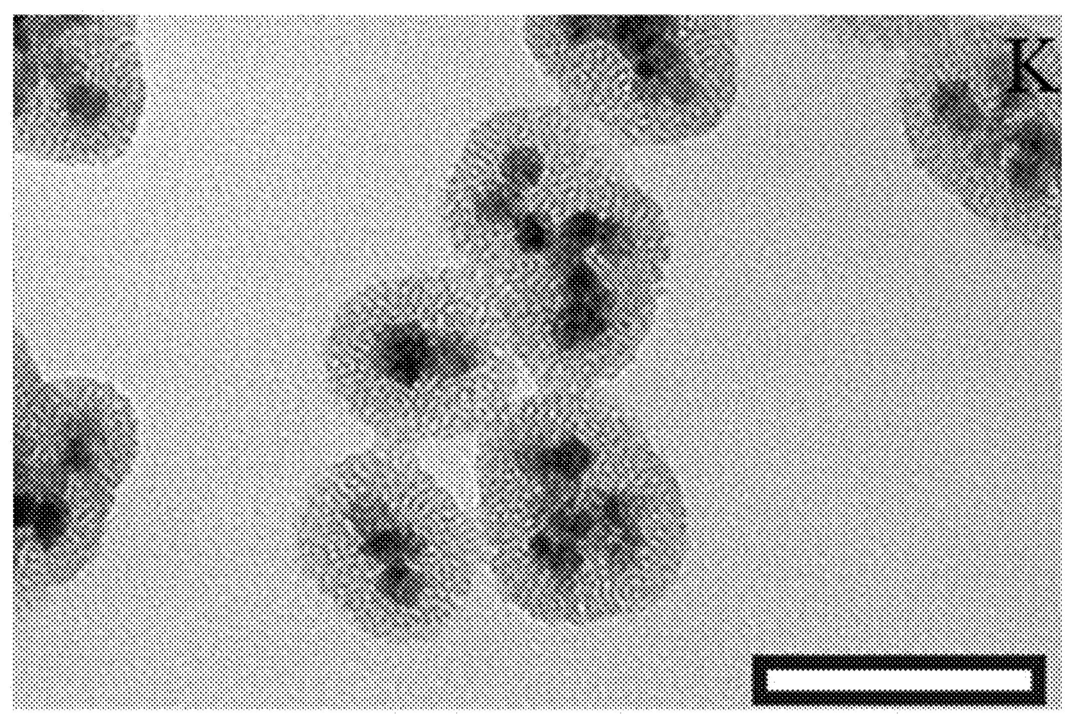
Figure 2L:
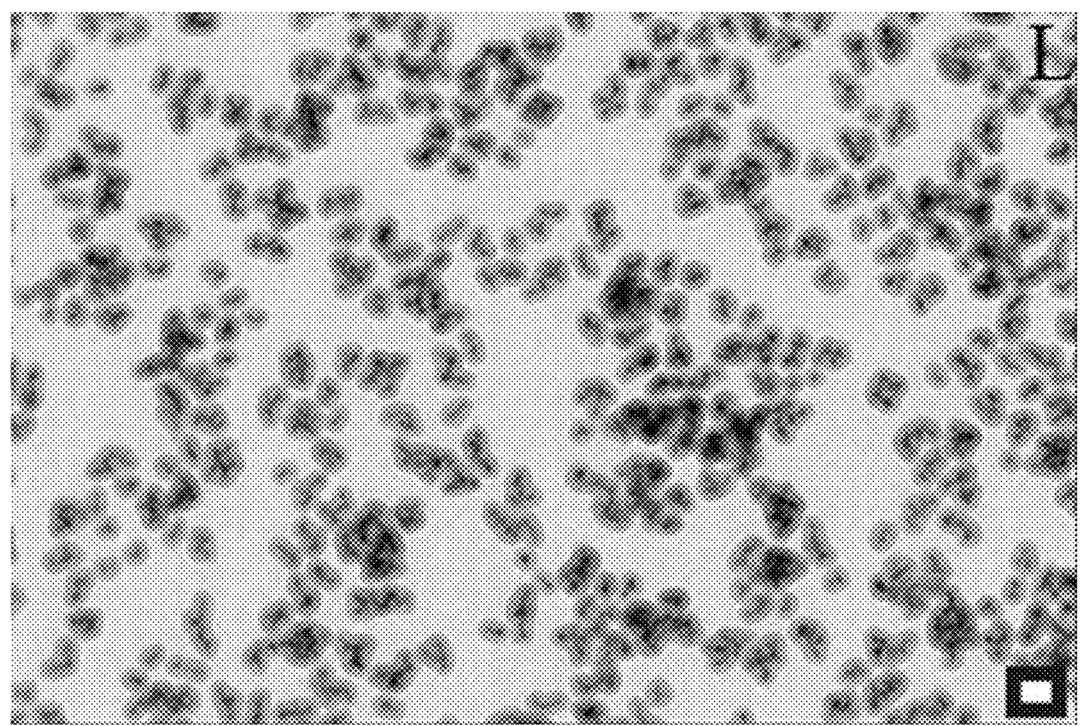

This embodiment is an example of a method for preparing a mesoporous silica wrapped nanoparticle composite nanomaterial, comprising the following steps:

(1) dispersing $CeO_2$NPs (particle size 12 nm, TEM diagram shown in FIG. 2J) in an aqueous ethanol solution (volume ratio of ethanol to water=1:4), then adding ammonia water and stirring for 30 min to obtain solution A having a pH of 10 (the specific surface area of the nanoparticles are calculated according to their particle sizes; for the ratio of mass of CTAB to the specific surface area of the nanoparticles to be 3 mg: $10^{17}$ $nm^2$, the concentration of $CeO_2$NPs in solution A should be 1.5 mg/mL); adding CTAB to an identical aqueous ethanol solution and stirring for 30 min to obtain solution B, wherein the concentration of CTAB in solution B is 30 mg/mL;

(2) adding solution B dropwise to solution A under ultrasound (volume ratio of solution B to solution A=1:9), and then continue performing the ultrasound for at least 30 minutes to obtain solution C;

(3) adding TEOS dropwise to solution C at a ratio of TEOS:CTAB=1 mL:5 g, followed by 12 hours of stirring, then centrifuging, and washing the solid collected 3 times (each time, the solid is added to the washing liquid, mixed for half an hour, and then centrifuged to obtain the composite nanomaterial; the washing liquid is prepared from ammonium nitrate and ethanol at a ratio of ammonium nitrate:ethanol=2 g:100 mL). The composite nanomaterial is $SiO_2$@$CeO_2$NPs, its TEM diagrams are shown in FIGS. 2K and 2L.

Embodiment 5

Figure 3A:
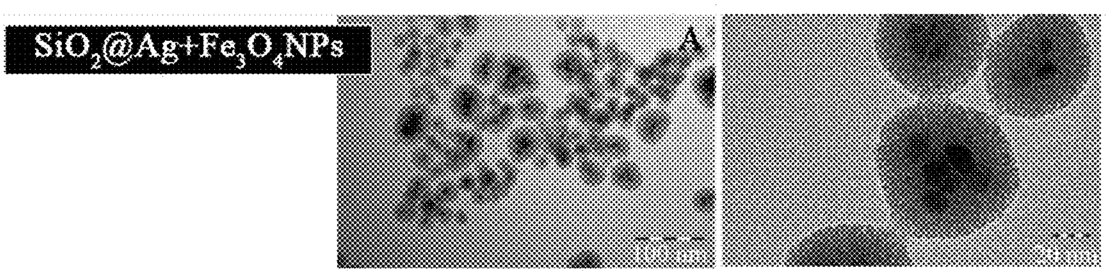
FIGS. 3A-3B are TEM images and elemental analysis spectra of one of the mesoporous silica wrapped nanoparticle composite nanomaterials prepared according to the preparation method of the present disclosure.
Figure 3B:
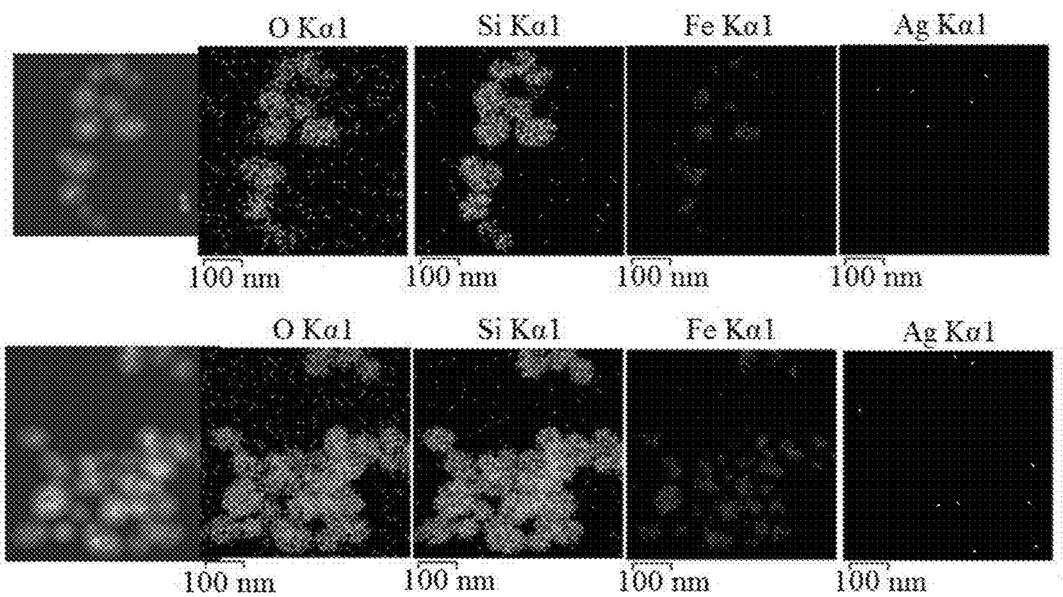
Figure 4A:
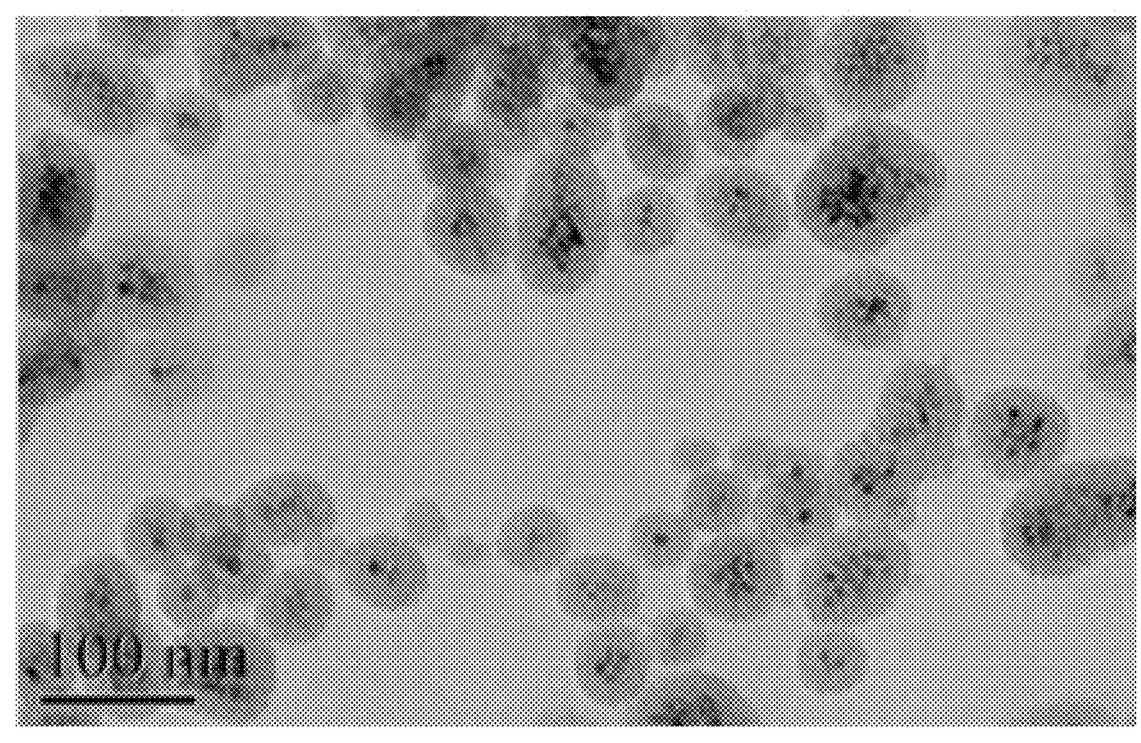
FIGS. 4A-4D are TEM images and elemental analysis spectra of one of the mesoporous silica wrapped nanoparticle composite nanomaterials prepared according to the preparation method of the present disclosure.
Figure 4B:
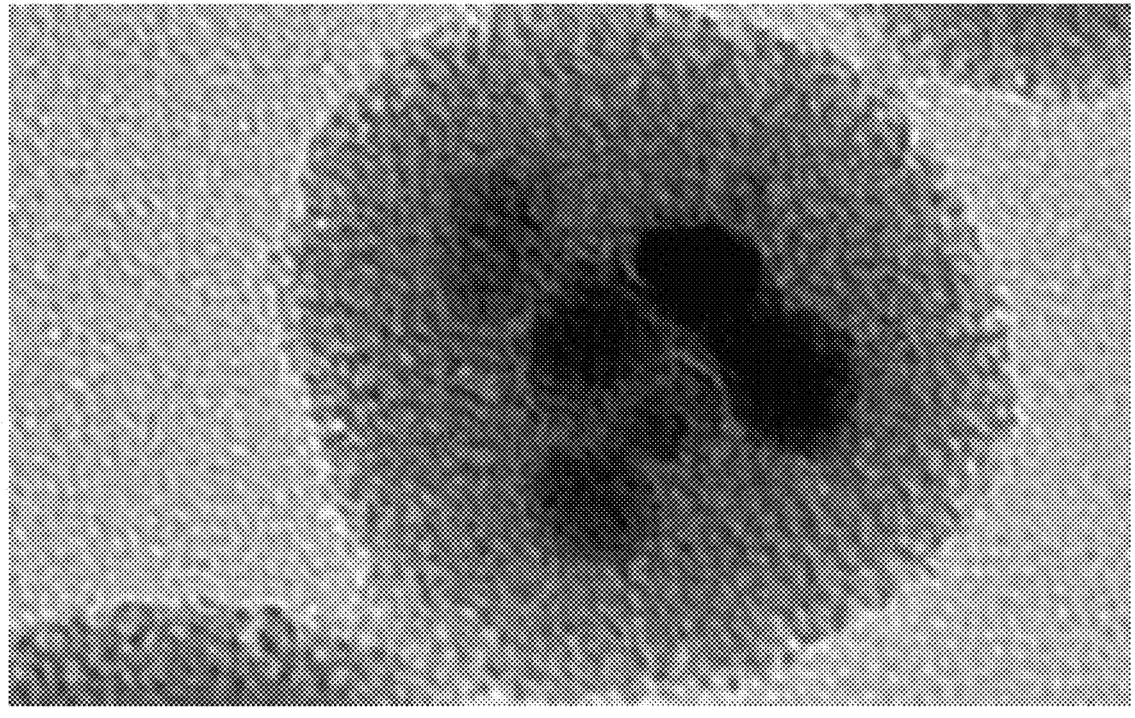
Figure 4C:
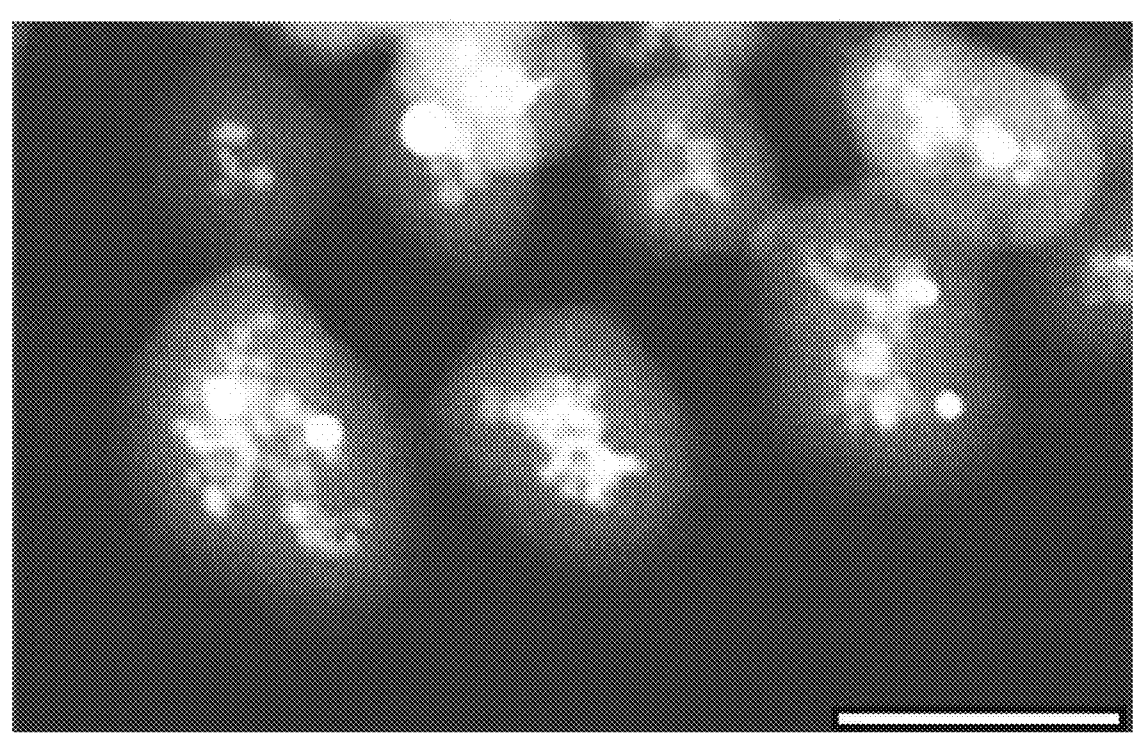
Figure 4D:
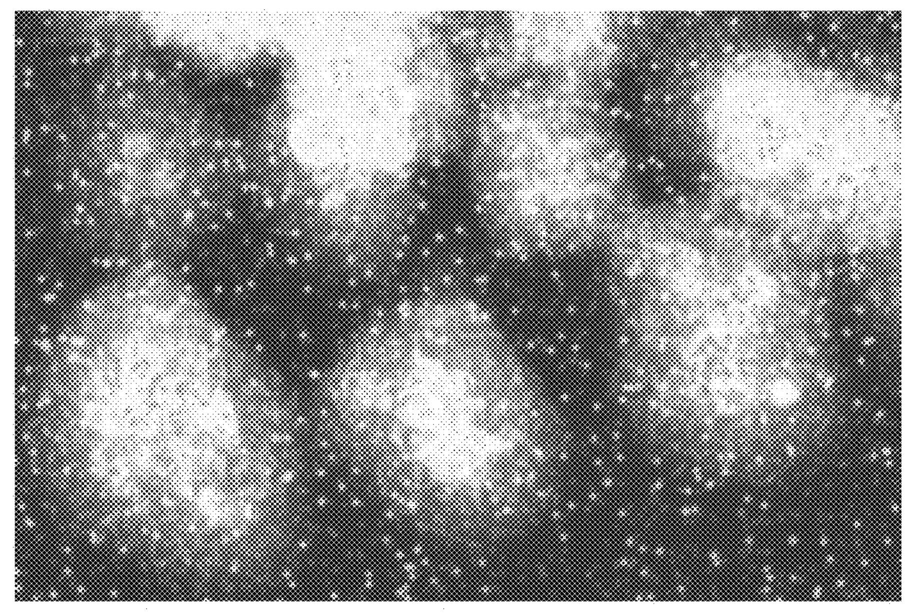

This embodiment is an example of a method for preparing a mesoporous silica wrapped nanoparticle composite nanomaterial, comprising the following steps:

(1) dispersing AgNPs (particle size 10 nm) and $Fe_3O_4$NPs (particle size 7 nm) in an aqueous ethanol solution (volume ratio of ethanol to water=1:4), then adding ammonia water and stirring for 30 min to obtain solution A having a pH of 10, a AgNPs concentration of 0.05 mg/mL, a $Fe_3O_4$NPs concentration of 0.6 mg/mL; adding CTAB to an identical aqueous ethanol solution and stirring for 30 min to obtain solution B, wherein the concentration of CTAB in solution B is 30 mg/mL;

(2) adding solution B dropwise to solution A under ultrasound (volume ratio of solution B to solution A=1:9, the ratio of mass of CTAB to the total specific surface area of AgNPs and $Fe_3O_4$NPs is 3 mg: $10^{17}$ $nm^2$), and then continue performing the ultrasound for at least 30 minutes to obtain solution C;

(3) adding TEOS dropwise to solution C at a ratio of TEOS:CTAB=1 mL:5 g, followed by 12 hours of stirring, then centrifuging, and washing the solid collected 3 times (each time, the solid is added to the washing liquid, mixed for half an hour, and then centrifuged to obtain the composite nanomaterial; the washing liquid is prepared from ammonium nitrate and ethanol at a ratio of ammonium nitrate:ethanol=2 g:100 mL). The composite nanomaterial is $SiO_2$@AgNPs+$Fe_3O_4$NPs, its TEM diagrams and elemental analysis spectra are shown in FIGS. 3A-3B.

Embodiment 6

This embodiment is an example of a method for preparing a mesoporous silica wrapped nanoparticle composite nanomaterial, comprising the following steps:

(1) dispersing AuNPs (particle size 10 nm), $Fe_3O_4$NPs (particle size 7 nm), and $CeO_2$NPs (particle size 4 nm) in an aqueous ethanol solution (volume ratio of ethanol to water=1:4), then adding ammonia water and stirring for 30 min to obtain solution A having a pH of 10, a AuNPs concentration of 0.05 mg/mL, a $Fe_3O_4$NPs concentration of 0.3 mg/mL, a $CeO_2$NPs concentration of 0.3 mg/mL; adding CTAB to an identical aqueous ethanol solution and stirring for 30 min to obtain solution B, wherein the concentration of CTAB in solution B is 30 mg/mL;

(2) adding solution B dropwise to solution A under ultrasound (volume ratio of solution B to solution A=1:9, the ratio of mass of CTAB to the total specific surface area of AuNPs, $Fe_3O_4$NPs, and $CeO_2$NPs is 3 mg: $10^{17}$ $nm^2$), and then continue performing the ultrasound for at least 30 minutes to obtain solution C;

(3) adding TEOS dropwise to solution C at a ratio of TEOS:CTAB=1 mL:5 g, followed by 12 hours of stirring, then centrifuging, and washing the solid collected 3 times (each time, the solid is added to the washing liquid, mixed for half an hour, and then centrifuged to obtain the composite nanomaterial; the washing liquid is prepared from ammonium nitrate and ethanol at a ratio of ammonium nitrate:ethanol=2 g:100 mL). The composite nanomaterial is $SiO_2$@AuNPs+$Fe_3O_4$NPs+$CeO_2$NPs, its TEM diagrams and elemental analysis spectra are shown in FIGS. 4A-4D.

Embodiment 7

Figures 5A, 5B:
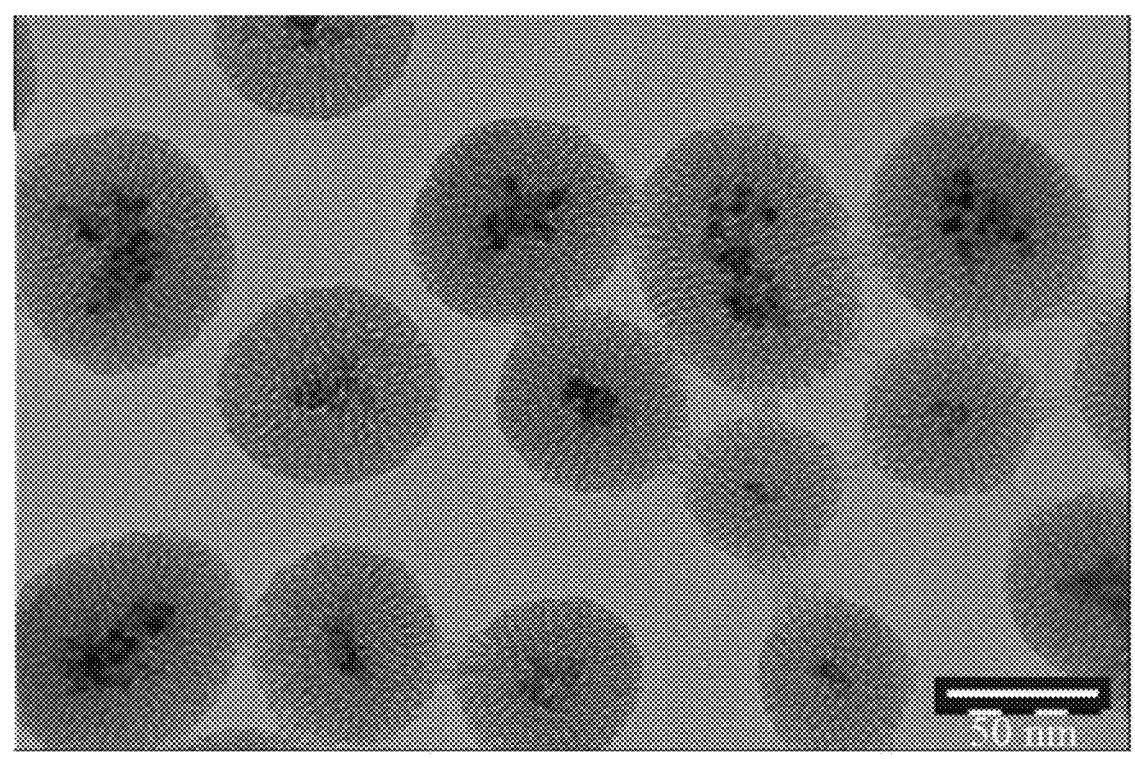
FIG. 5A shows the key factors affecting the preparation of $SiO_2$@CeO2NPs according to the preparation method of the present disclosure.
FIG. 5B shows the TEM images of the $SiO_2$@$CeO_2$NPs (scale bar: 50 nm)

In this embodiment, the key influencing factors and optimal process conditions for the preparation of $SiO_2$@$CeO_2$NPs by the method of the present disclosure are examined. The preparation method under the optimal process conditions (as shown in FIG. 5A) is as follows: dispersing $CeO_2$NPs (particle size 4 nm) in an aqueous ethanol solution, then adding ammonia water to adjust pH to obtain solution A with a $CeO_2$NPs concentration of 0.6 mg/mL; adding CTAB to an identical aqueous ethanol solution to obtain solution B, wherein the concentration of CTAB in solution B is 30 mg/mL; adding solution B dropwise to solution A under ultrasound (volume ratio of solution B to solution A=1:9, the ratio of mass of CTAB to the total specific surface area of AgNPs and $Fe_3O_4$NPs is 3 mg:$10^{17}$ $nm^2$), and then continue performing the ultrasound for at least 30 minutes to obtain solution C; adding TEOS dropwise to solution C at a ratio of TEOS:CTAB=1 mL:5 g, followed by 12 hours of stirring, then centrifuging, and washing the solid collected 3 times (each time, the solid is added to the washing liquid, mixed for half an hour, and then centrifuged to obtain the composite nanomaterial; the washing liquid is prepared from ammonium nitrate and ethanol at a ratio of ammonium nitrate:ethanol=2 g:100 mL). The composite nanomaterial is $SiO_2$@$CeO_2$NPs, its TEM diagrams are shown in FIG. 5B.

(a) When studying the effect of the ratio of the mass of CTAB to the specific surface area of $CeO_2$NPs on $SiO_2$@$CeO_2$NPs, the other conditions were the same as the optimal process conditions. When the ratio of the mass of CTAB to the specific surface area of $CeO_2$NPs was higher than 3 mg/$10^{14}$ $nm^2$ or lower than 1 mg/$10^{17}$ $nm^2$, the TEM diagrams of the SiO2@$CeO_2$NPs obtained are respectively shown in FIG. 5C. When the ratio of the mass of CTAB to the specific surface area of the nanoparticles was greater than 3 mg/$10^{14}$ $nm^2$, some part of the nanoparticles was coated with silica and some part was not. It was difficult to control the size of the final material, the coating was uneven or unsuccessful. When the ratio of the mass of CTAB to the specific surface area of the nanoparticles was less than 1 mg/$10^{17}$ $nm^2$, the core-shell structure produced was not uniform, its size was uncontrollable, or the coating was unsuccessful.

(b) When studying the effect of pH of solution A on $SiO_2$@$CeO_2$NPs, the other conditions were the same as the optimal process conditions. The TEM diagrams of the SiO2 @ CeO2NPs obtained when the pH of solution A was greater than 10 or less than 9 are respectively shown in FIG. 5C.

Figure 5C:
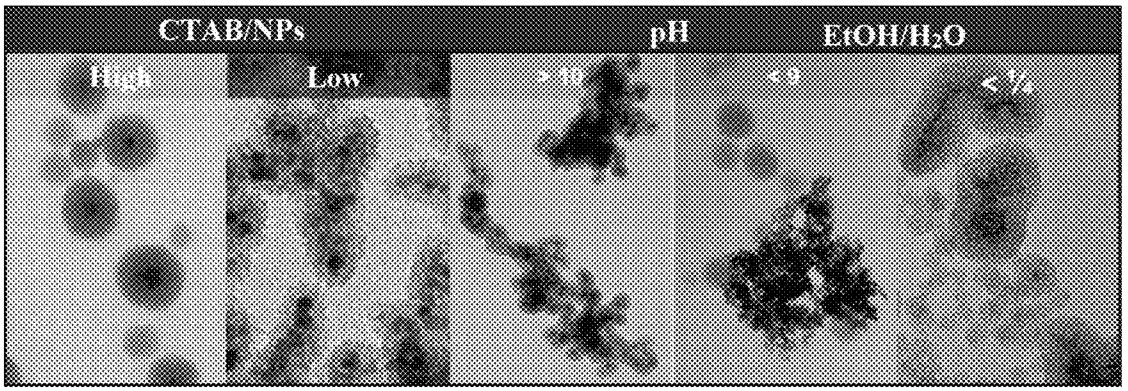
FIG. 5C shows the effect of different parameters on the structure and morphology of $SiO_2$@$CeO_2$NPs.
Figure 5D:
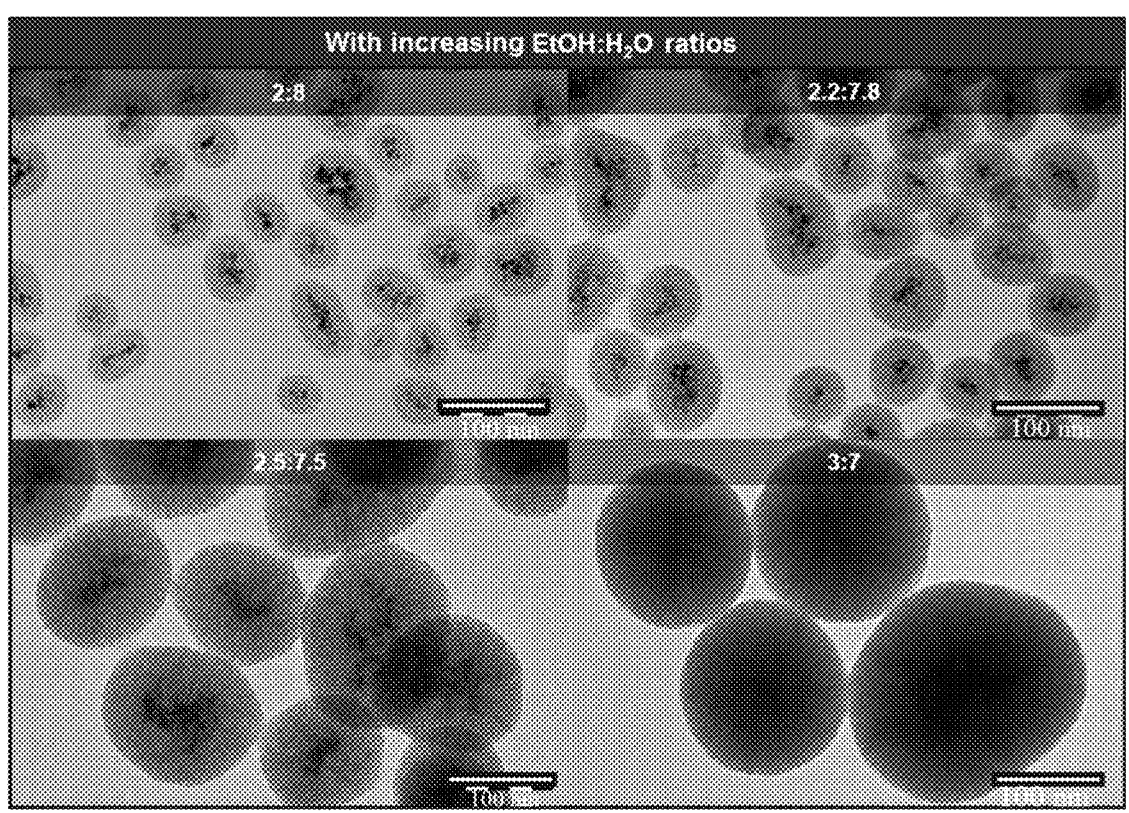
FIG. 5D shows the effect of varying volume ratios of ethanol to water in the ethanol aqueous solution on the size of $SiO_2$@$CeO_2$NPs (scale bar: 100 nm).

(c) When studying the effect of the ratio of ethanol to water in the aqueous ethanol solution on $SiO_2$@$CeO_2$NPs, the other conditions were the same as the optimal process conditions. The TEM diagram of the $SiO_2$@$CeO_2$NPs obtained when the volume ratio of ethanol to water was less than ¼ is shown in FIG. 5C. The TEM diagrams of the $SiO_2$@$CeO_2$NPs obtained when the volume ratios of ethanol to water were 2:8, 2.2:7.8, 2.5:7.5, or 3:7 are respectively shown in FIG. 5D. From the TEM diagrams of these $SiO_2$@$CeO_2$NPs, it can be concluded that when preparing $SiO_2$@$CeO_2$NPs, the ratio of the mass of CTAB to the specific surface area of $CeO_2$NPs, the pH of solution A, and the volume ratio of ethanol to water in the aqueous ethanol solution should be moderate to avoid failure of wrapping the $CeO_2$NPs or failure for $SiO_2$ to form a uniform and stable spherical shape. In addition, during the research process, it was found that the volume ratio of ethanol to water in the aqueous ethanol solution is the main factor impacting $SiO_2$@$CeO_2$NPs. As shown in FIG. 5D, when the volume ratio of ethanol to water in the aqueous ethanol solution increases, the particle size of the $SiO_2$@$CeO_2$NPs produced increases.

It should be finally noted that the embodiments described above are only intended to illustrate the technical solutions of the present disclosure. They do not limit the scope of protection of the present disclosure. Those skilled in the art understand that various alterations and modifications can be carried out without departing from the spirit and scope of the present invention.

What is claimed is:

1. A method for preparing a mesoporous silica wrapped nanoparticle composite nanomaterial, comprising the following procedures:

(1) dispersing a nanoparticle in an aqueous ethanol solution, then adding ammonia water and stirring thoroughly to obtain solution A; dissolving cetyltrimethylammonium bromide in an identical aqueous ethanol solution to obtain solution B;

(2) adding solution B dropwise to solution A under ultrasound, and then continue performing ultrasound to obtain solution C;

(3) adding tetraethyl orthosilicate dropwise to solution C, followed by consecutive stirring, solid-liquid separation and purification to obtain the composite nanomaterial;

wherein the nanoparticle has a particle size of 1-20 nm;

wherein in the aqueous ethanol solution, a volume ratio of ethanol to water is 1:3-4;

wherein solution A has a pH of 9-10;

wherein a ratio of mass of the cetyltrimethylammonium bromide to a specific surface area of the nanoparticle is 1 mg-3 mg: $10^{14}$ $nm^2$-$10^{17}$ $nm^2$; and wherein in step (2), the ultrasound is continued for at least 30 minutes.

2. The method according to claim 1, wherein a volume ratio of solution B to solution A is 1:9.

3. The method according to claim 1, wherein in step (2), the cetyltrimethylammonium bromide has a concentration of 30 mg/mL in solution B.

4. The method according to claim 1, wherein in step (3), a ratio of the tetraethyl orthosilicate to the cetyltrimethylammonium bromide is 1 mL:5 g, the stirring is performed for 12 h.

* * * * *